Nov. 2, 1926.   1,605,859
W. D. SMITH ET AL
FILLING STATION
Filed Oct. 21, 1922   10 Sheets-Sheet 1

Nov. 2, 1926.  W. D. SMITH ET AL  1,605,859
FILLING STATION
Filed Oct. 21, 1922    10 Sheets-Sheet 6

Willard D. Smith,
Harry D. Smith,
Sherwood Hinds,
   Inventors,
Delos G. Haynes,
   Attorney Nov. 2, 1926.

W. D. SMITH ET AL 1,605,859

FILLING STATION

Filed Oct. 21, 1922    10 Sheets-Sheet 8

Fig. 14.

Willard D. Smith,
Harry D. Smith,
Sherwood Hinde,
    Inventors,
Delos G. Haynes,
    Attorney Nov. 2, 1926.  1,605,859
W. D. SMITH ET AL
FILLING STATION
Filed Oct. 21, 1922  10 Sheets-Sheet 10

Willard D. Smith,
Harry D. Smith,
Sherwood Hinds,
Inventors,
Delos G. Haynes,
Attorney Patented Nov. 2, 1926.

1,605,859

UNITED STATES PATENT OFFICE.

WILLARD D. SMITH, OF MAPLEWOOD, HARRY D. SMITH, OF ST. LOUIS, AND SHERWOOD HINDS, OF RICHMOND HEIGHTS, MISSOURI, ASSIGNORS TO ST. LOUIS PUMP & EQUIPMENT COMPANY, OF ST. LOUIS, MISSOURI, A CORPORATION OF MISSOURI.

FILLING STATION.

Application filed October 21, 1922. Serial No. 595,969.

This invention relates to mechanical apparatus and with regard to certain more specific features to filling stations.

Among the several objects of the invention may be noted the provision of simple and compact liquid-dispensing apparatus; the provision of reliable and durable means for indicating and recording the amounts of liquid dispensed; and the provision of apparatus inexpensive in construction, accurate in operation, easily assembled and readily disassembled for inspection and repair. Other objects will be in part obvious and in part pointed out hereinafter.

The invention accordingly consists in the elements and combinations of elements, features of construction, and arrangements of parts which will be exemplified in the structure hereinafter described and the scope of the application of which will be indicated in the following claims.

In the accompanying drawings, in which is shown one of various possible embodiments of the invention.

Fig. 10 is a vertical longitudinal section on the line 10—10 of Fig. 7, viewed from the left;

Similar reference characters indicate corresponding parts throughout the several views of the drawings.

Construction.

*In general.*—Referring now more particularly to Figs. 1 to 4 of the accompanying drawings, there is illustrated a gasoline filling station comprising what may be termed a series of six sections or compartments or levels numbered 1 to 6 respectively. The first, second, fourth, fifth and sixth levels have floors, separating the levels more or less completely (as the case may be) from the level below.

In the first level 1 are located the inlet and overflow pipes from and to a reservoir (not shown), the motor, the wiring junction box, and the separator or filter.

In the second level 2 is mounted the pump and the clutch for disconnecting the motor from the pump.

In the third level 3 is mounted the hand-operated drive for the pump.

In the fourth level 4 are mounted the scale, indicating and totalizing devices, operating handles, valves, and associated parts.

In the fifth level 5 are the container (which may be transparent if desired), scale arms, discharge pipe and hose, siphon, siphon-breaker, fluid seal for overflow conduit, fluid seal for distributor head, gauge glass, and screen.

In the sixth level 6 are provided a dome, and a translucent globe for illuminating and/or advertising purposes.

For convenience, the six levels will be considered separately.

*First level* (Fig. 2).—The base 10 is a casting having a hole 12 at each of its four corners so that the base can be attached to a floor or other surface.

Figure 1:
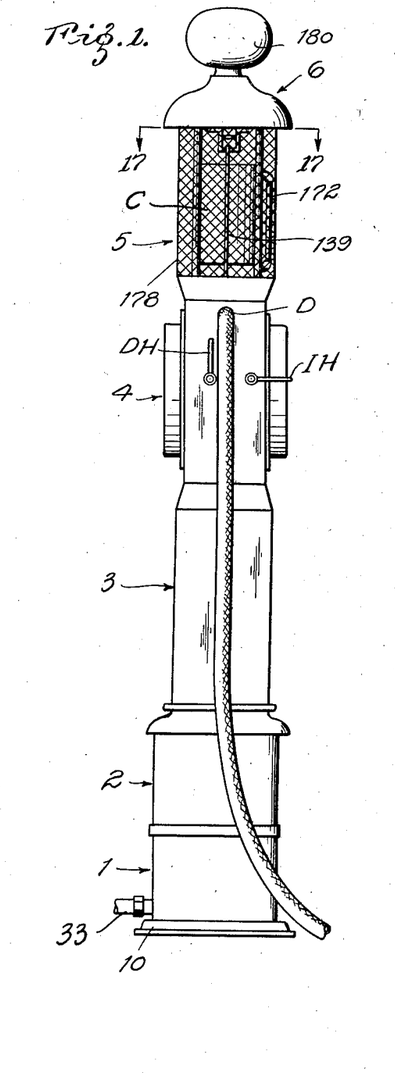
Fig. 1 is a front elevation.
Figure 2:
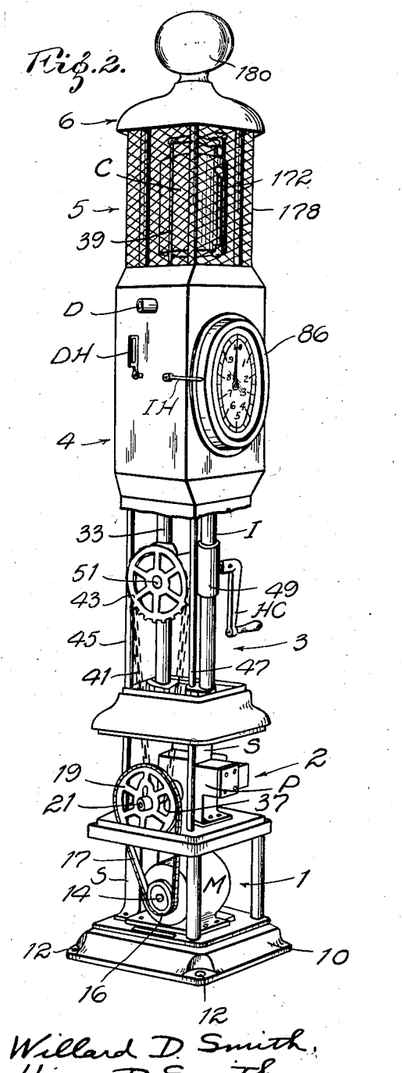
Fig. 2 is a perspective of the front and right sides, with side covers removed.

The motor M has a shaft 14 which runs from front to back of the machine and has on its front end a pulley 16 to receive a link type V belt 17. The belt runs over a clutch pulley 19 loosely mounted on the shaft 21 of the pump P in the second level.

The inlet pipe 23 extends horizontally into the left side of the machine near the rear, and goes into a separator or filter S.

The separator S is of any suitable construction. The gasoline passes upwardly through the separator.

From the separator the gasoline passes upwardly into the inlet side of the pump P in the second level.

The overflow pipe 33 extends horizontally into the left side of the machine, forwardly of the inlet pipe 23, and thence passes upwardly through the second, third and fourth levels.

At the right front of the machine is a pipe 47 extending through the first, second and third levels for steadying purposes and for housing the electric wires to the motor switch. If there is a lamp on the sixth level, additional wiring is provided in this pipe for such lamp, and suitable conduit is provided in the forth, fifth and sixth levels, for such wiring.

*Second level* (Fig. 2).—The pump P, which is preferably of the rotary type, has the shaft 21 above mentioned, extending from front to rear of the machine, and carrying loosely mounted adjacent its forward end the clutch pulley 19 carrying the motor belt 17. The pump shaft carries also a sprocket 37. On this sprocket is a chain 41 passing upwardly over a sprocket 43 in the third level, the latter sprocket being connected to the hand drive of the machine.

The gasoline inlet 23 to the pump is at the left of the machine, and the outlet from the pump is connected to the inlet pipe I, which runs upwardly through the third level on the right side of the machine, and enters the valves in the fourth level.

The overflow pipe 33 passes upwardly through the second level at the left side of the machine and extends up to the third level and thence to the discharge valve in the fourth level and to the liquid-seal connection to the container overflow in the fifth level.

At the left front is a small rod 45 that is simply for steadying purposes, extending through the second and third levels only.

At the right front is the pipe 47 above mentioned.

*Third level* (Fig. 2).—In the third level there are the three pipes and the rod above mentioned, namely, inlet pipe I at the right, overflow pipe 33 at the left, wiring pipe 47 at the right front, and steadying rod 45 at the left front.

Figure 18:
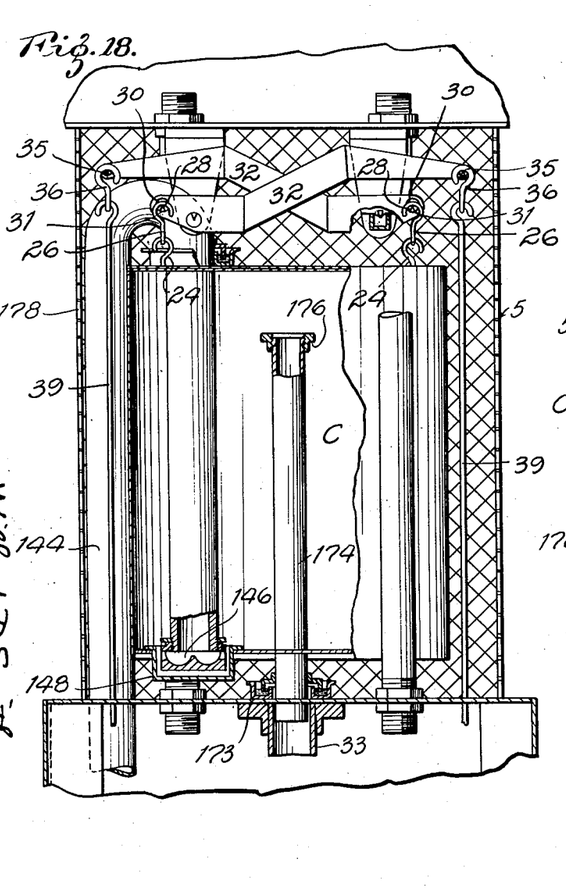
Fig. 18 is a left side elevation, partly in section, showing the fifth level.
Figure 19:
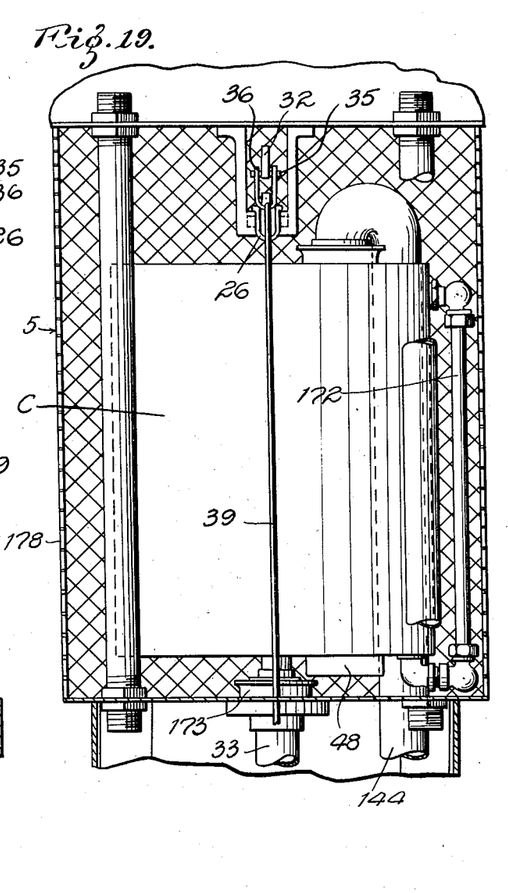
Fig. 19 is a front elevation, partly in section, showing the fifth level.
Figure 20:
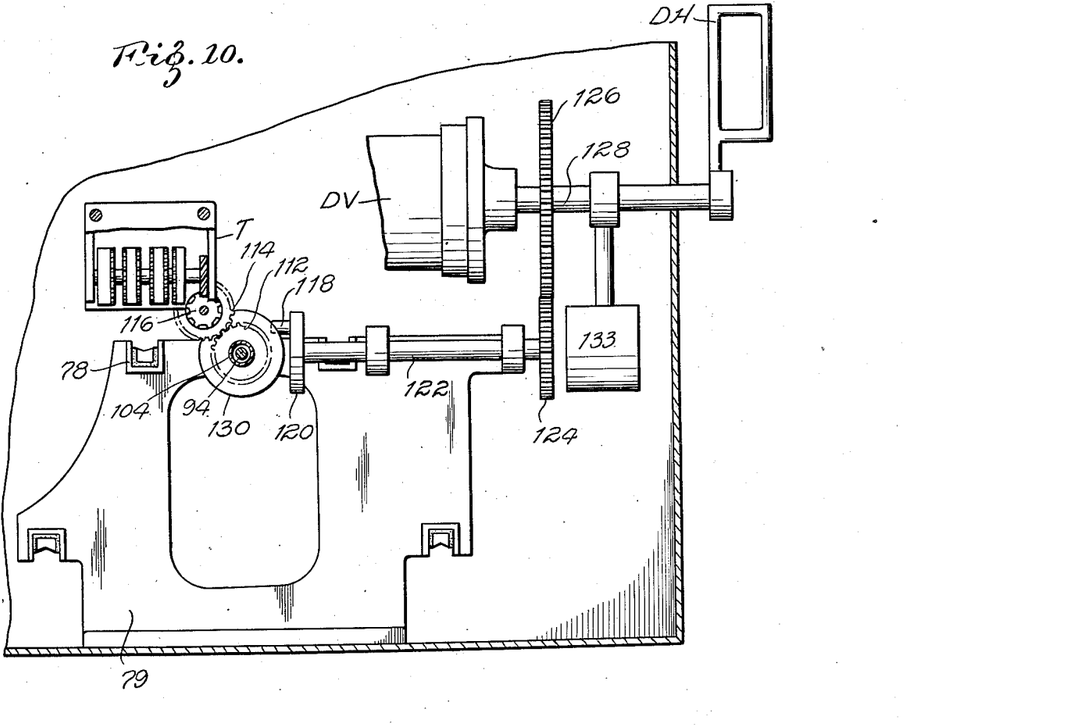
Fig. 20 is a vertical transverse section on the line 20—20 of Fig. 8, viewed from the left.

*Fourth level* (Figs. 1 to 15).—The scale K (Figs. 5 to 11, 13 to 15, 17 and 18) is of the so-called pendulum type. The container C has two hooks 24 in the top, to which are attached swivels 26 each resting upon a knife edge 28. Each knife edge comprises two knife-edge bearings 30 (Figs. 18 and 19) connected by a cylindrical portion 31 that has a pressed fit into an aperture in the respective scale arm 32, the edge facing upwardly.

The knife edges are attached adjacent the end of each scale arm, and adjacent the other end of each arm is another knife edge 35 similarly attached to the arm. On each knife edge 35 is hung a swivel 36 connected to a scale rod 39. Each scale rod is attached at its lower end (Fig. 5) to a turn-buckle 53, to which is connected a lower scale rod 54. Each lower scale rod is connected to a swivel 56 which bears against a knife edge 58 adjacent the end of the respective lower scale arm 60.

At the opposite end of each lower scale arm 60 is attached a steel ribbon 62, which is secured at its upper end to an equalizing block 64. To the upper part of the equalizing block are attached two steel ribbons 66, which pass around the properly curved surfaces of the respective sectors 68. Each sector acts as one arm of a bell-crank lever 71, the other arm 73 of which carries at its outer end a weight 75. Each bell-crank carries a pair of knife edges 76, one on either side of the median plane of the bell-crank. The knife edges rest in bearing 78 carried in plates 79 secured to the frame of the apparatus.

The weight of the container (and its contents) is thus transmitted to the upper scale arm 32, thence through the upper scale rods 39, turn-buckles 53, lower scale rods 54, lower scale arms 60, lower bands 62, equalizing block 64, upper bands 66, and bell-cranks 71, to the weights 75. On the outer end of each lower scale arm 60 is a counterweight 81, which by virtue of its position opposes the weight of the container. The parts are so proportioned that the counterweights balance the weight of the container itself, and the contents of the container are balanced by the pendulum weights 75. The counterweights are adjustable and may be sealed by inspectors, by suitable means such as the seals illustrated conventionally at 83 in Fig. 5.

Figure 9:
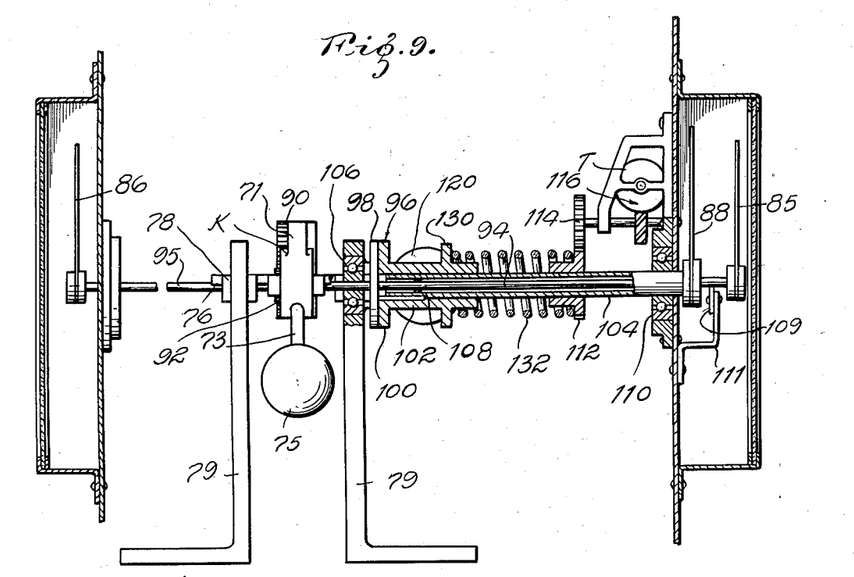
Fig. 9 is a vertical transverse section on the line 9—9 of Fig. 7, viewed from the rear, showing the parts in discharge position.
Figure 11:
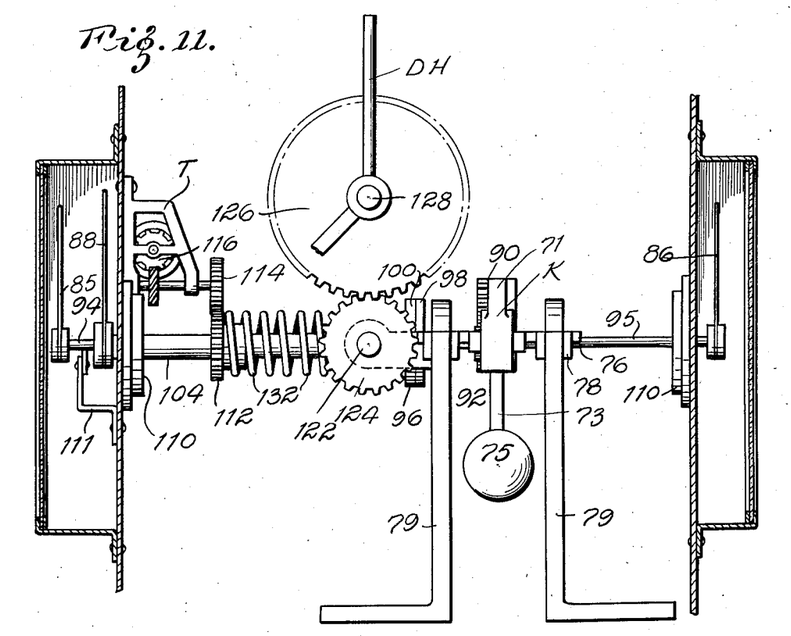
Fig. 11 is a vertical transverse section on the line 11—11 of Fig. 7, viewed from the front.

The indicating and totalizing mechanism (Figs. 9 to 11, and 14 to 16) comprises a pair of indicating needles 85, 86 located respectively at the left and right sides of the apparatus, a totalizing needle 88 at the left side of the apparatus, a totalizer T (Figs. 3, 7 and 10), and driving mechanism therefor. The driving mechanism comprises a segment 90 (Figs. 5, 7, 9, and 14 to 16) carried upon the sector arm 68 of the bellcrank 71; each sector meshes with a gear 92 (Figs. 7, 9 and 11) mounted upon an indicating needle shaft 94, 95 respectively; each shaft carries at its outer end the respective indicating needle 85, 86. The totalizing needle 88 is driven from the shaft 94 (Fig. 9) through a clutch 96 comprising a driving member in the form of a friction disc 98 secured to the shaft 94, and a driven member 100 in the form of a friction disc mounted on a sleeve 102 keyed to the hollow totalizing shaft 104 which surrounds the indicating needle shaft 94 (Fig. 9). The latter is mounted in a bearing 106 in a plate 79 secured to the frame of the apparatus, and has two other bearings. One is shown at 108 and serves to mount the shaft 94, concentrically within the hollow totalizing shaft 104. The other is shown at 109 in Fig. 9 and comprises a pair of rollers on which the right-hand end (Fig. 9) of the shaft 94 rests; these rollers are supported on a bracket 111 mounted on a stationary part of the apparatus. The hollow shaft 104 has adjacent one end a bearing 110 in the frame of the apparatus, and at its other end is supported through the bearing 108 (Fig. 9), thence through the indicating needle shaft 94 and its bearing 106. The other indicating needle shaft 95 is supported in bearings (not shown), one in the left-hand plate 79 (Fig. 9) and the other in the portion of the frame adjacent the left end (Fig. 9) of the shaft.

When the clutch 96 is in engagement, movement of the indicating needle shaft 94 causes corresponding movement of the totalizing shaft 104. Movement of the latter rotates directly the totalizing pointer 88 and also rotates the totalizer T through the gear 112 fixed upon the totalizing shaft 104, gear 114 meshing therewith, and the gearing illustrated conventionally at 116.

Figure 14:
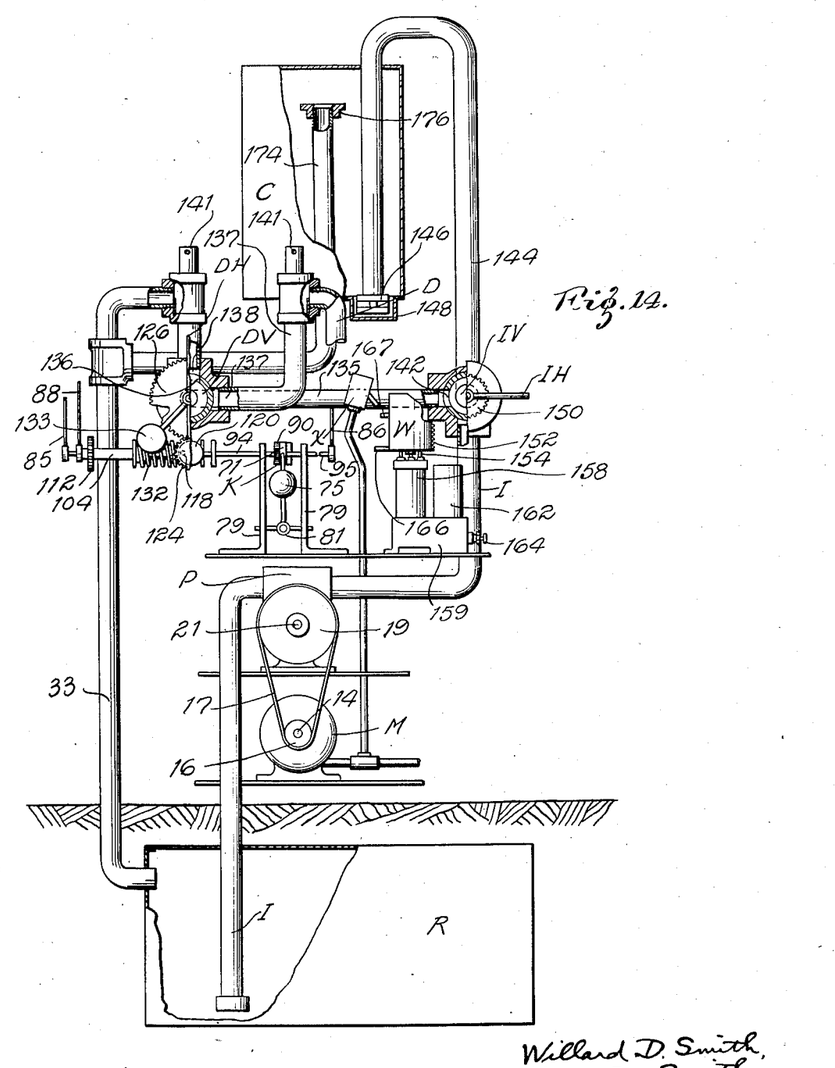
Fig. 14 is a vertical transverse section on the line 14—14 of Fig. 8, viewed from the front, showing somewhat diagrammatically the parts in neutral position.
Figure 15:
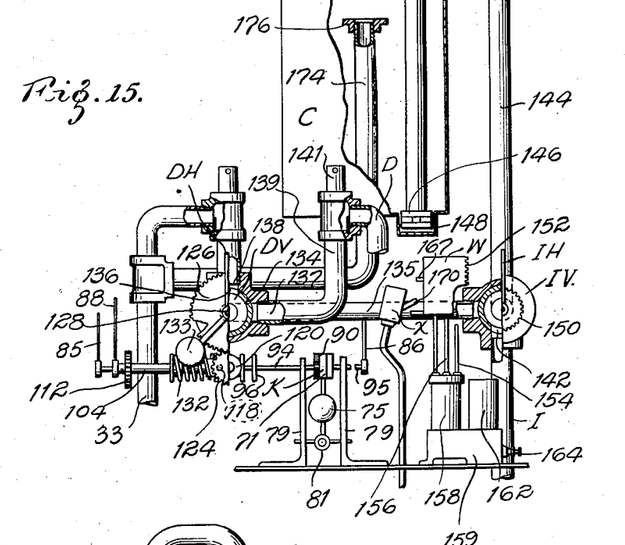
Fig. 15 is a view similar to the fourth and fifth level portions of Fig. 14, showing the parts in inlet position.
Figure 16:
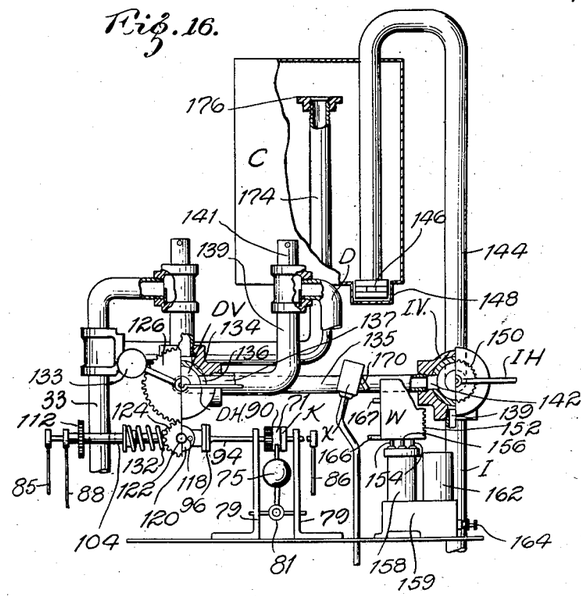
Fig. 16 is a view similar to Fig. 15, showing the parts in discharge position.
Figure 17:
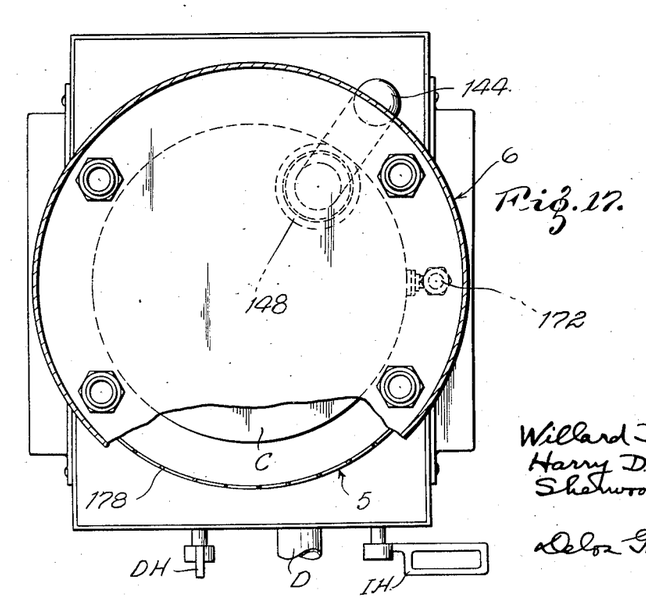
Fig. 17 is a horizontal section on the line 17—17 of Fig. 1.

The mechanism for opening and closing the clutch 96 comprises a pin 118 (Figs. 7, 9 and 10) fixed upon a disc 120 mounted on a shaft 122 carrying a gear 124 meshing with a gear 126 on the discharge shaft 128 carrying the discharge handle DH (Figs. 1, 2, 3, 5, 6, 8, 10, 11, 14, 15, 16). The normal or neutral position of the discharge handle is vertically upward, as indicated in Figs. 1, 2, 3, 5, 6, 8, 10, 11, 14 and 15. At this time the clutch 96 is open. When liquid is to be discharged, the discharge handle is moved in a clockwise direction (Figs. 1, 2, 6, 11 and 14 to 16) to a horizontal position as indicated in Fig. 16. Such movement of the discharge handle rotates the discharge shaft 128, gears 126 and 124, shaft 122, disc 120 and pin 118, the pin moving counterclockwise in Fig. 9, clockwise in Figs. 14 to 16, from the neutral position shown in Fig. 4 to the discharge position shown in Figs. 9 and 16. In the neutral position (Fig. 14) the pin abuts against the flange 130 of the driven member 100 of the clutch 96, and holds said driven member away from the driving member 98 of the clutch, at the same time compressing the compression spring 132. When the pin moves from neutral to discharge position it moves toward the driving member of the clutch, allowing the driven member to be forced toward and against the driving member by the spring 132 thereby closing the clutch during discharge. The parts are so arranged that the clutch closes, connecting the totalizing needle and totalizer to the indicating needle shaft 94, before the discharge valve begins to open, and similarly the clutch remains closed until after the discharge handle DH, during its closing movement, has closed the discharge valve hereinafter described. This insures connection of the driving handle and totalizer during the entire time of discharge.

Figure 3:
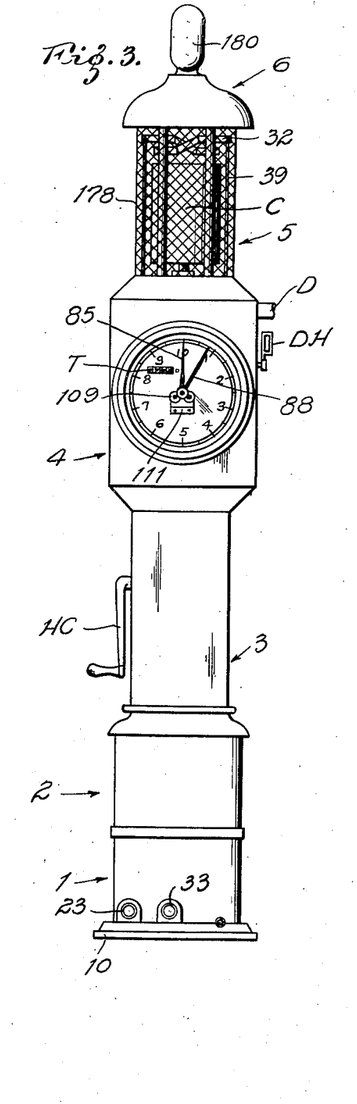
Fig. 3 is a left side elevation.
Figure 4:
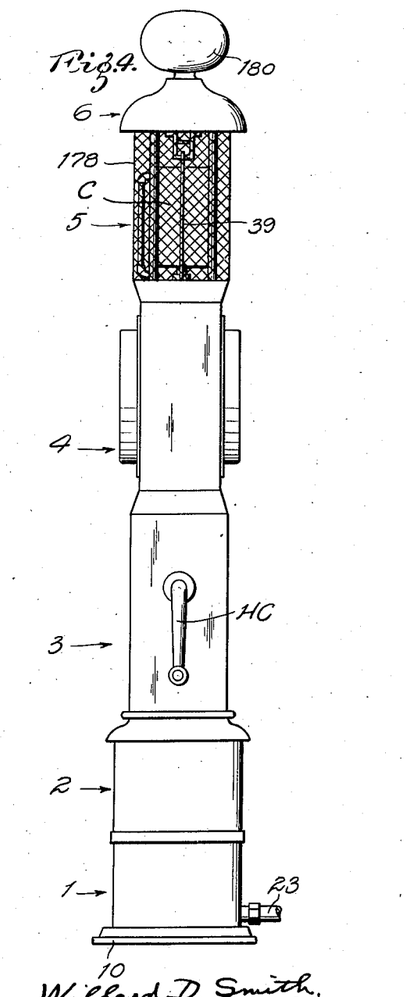
Fig. 4 is a rear elevation.
Figure 5:
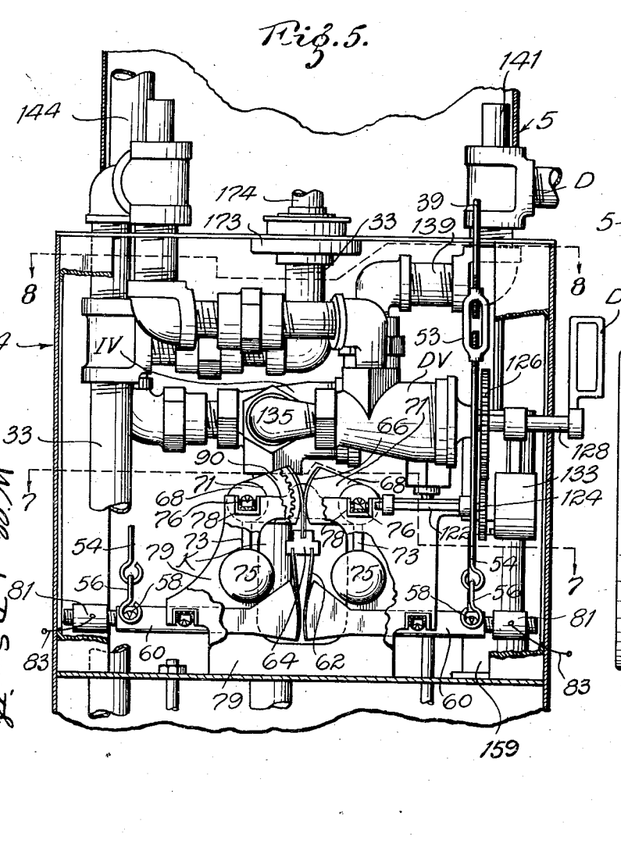
Fig. 5 is a vertical transverse section on the line 5—5 of Fig. 8, viewed from the left.
Figure 6:
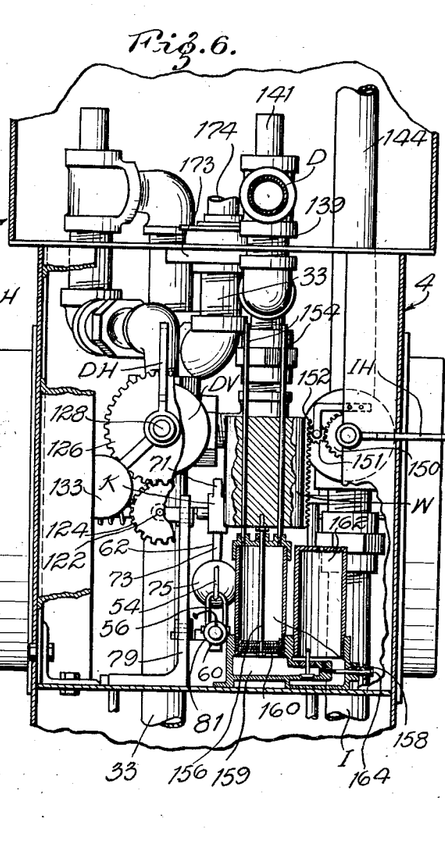
Fig. 6 is a front elevation of the fourth level, with the casing removed, and showing certain parts in section.
Figure 7:
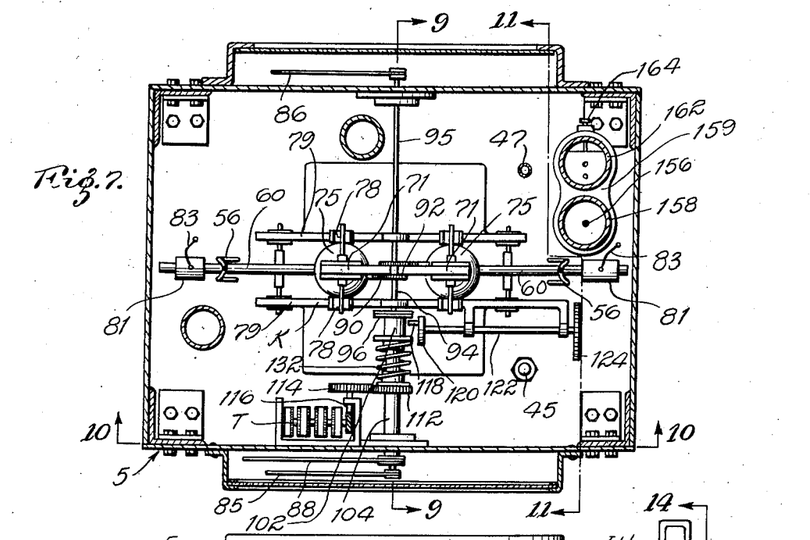
Fig. 7 is a horizontal section on the line 7—7 of Fig. 5.
Figure 8:
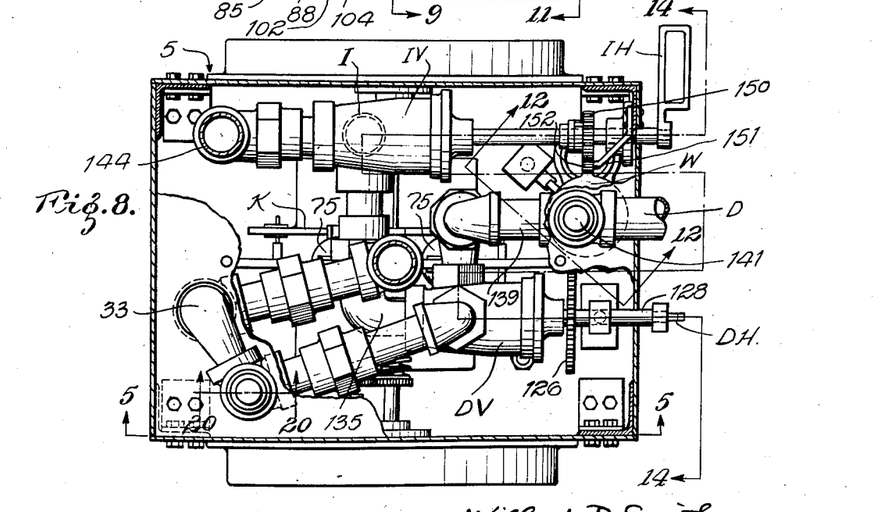
Fig. 8 is a horizontal section on the line 8—8 of Fig. 5.

The discharge handle DH (Figs. 1, 2, 3, 5, 6, 8, 10, 11 and 14 to 17) in addition to operating the clutch 96 for the totalizing devices, operates the discharge valve DV (Figs. 5, 6, 8, and 14 to 16). This valve comprises a stem secured to or integral with the discharge shaft 128 (Figs. 5, 8, 10 and 14 to 16). The valve is shown as of the end-opening type. Liquid enters the valve through the pipe 135 from the inlet valve IV. Liquid leaves the discharge valve through the outlet port 136. This outlet port is in a vertically upward position during neutral (Fig. 14) and at this time is in registry with the emptying port 138 which in turn communicates with the overflow pipe 33. During inlet (Fig. 15) the discharge valve DV is in the same position as during neutral. During discharge (Fig. 16) the discharge handle DH extends horizontally toward the right; at this time the outlet port 136 of the discharge valve DV is in registry with the port 137 communicating with the pipe 139 extending to the siphonbreaker 141 and dispensing device such as the hose D (Fig. 3).

The inlet handle IH (Figs. 1, 2, 6, 8, 14, 15, 16 and 17), extends horizontally toward the right (Figs. 1, 2, 6, 14, 16 and 17) during neutral (Fig. 14) and during discharge (Fig. 16). During inlet (Fig. 15) the handle extends vertically upward. The operator moves the handle from neutral to inlet position by turning it clockwise (Fig. 14), through three fourths of a revolution. The handle is returned automatically from inlet to neutral position by the weight W hereinafter described. The inlet handle operates the inlet valve IV above described and the weight W.

The inlet valve IV is of the end-opening type. During inlet the liquid enters the valve through the port 142 communicating with the inlet pipe I, and leaves the valve through the end-opening communicating with the pipe 144 that extends upwardly from the valve and thence downwardly into the container, terminating in a nozzle 146 located in depression 148 in the bottom of the container. The nozzle is so constructed that the liquid passing therethrough into the container during inlet is delivered in an approximately horizontal direction, so that it will not have any substantial force directed downwardly. Such a force might affect the operation of the weighing mechanism and the totalizer. During discharge (Fig. 16) liquid passes from the container through the pipe 144, end-opening of valve IV, into the valve, and thence through the port 142 and into the pipe 135 leading to the discharge valve DV above described. During neutral (Fig. 14), the inlet valve IV is in this same position.

The weight W is in its downward position (Figs. 14 and 16) during neutral and discharge. Movement of the inlet handle IH in clockwise direction (Fig. 14) from the neutral position (Fig. 14), to inlet position (Fig. 15) causes the weight to rise, through the medium of the gear 150 fixed upon the shaft of the inlet handle, meshing with an idler 151 (Fig. 6) which in turn meshes with a rack 152 mounted on the weight. The weight is mounted upon suitable guide rods 154, and carries a plunger rod 156 that passes down into a cylinder 158 of a dash-pot 159 and is secured to a plunger 160 therein, the plunger and cylinder forming a dash-pot so constructed as to retard the downward movement of the weight, while offering no substantial opposition to the upward movement thereof. The dash-pot is preferably of the liquid type, using oil or other suitable liquid. The oil that is ejected from the cylinder 158 by the downward movement of the plunger passes into a reservoir cylinder 162 through an adjustable needle valve 164. The adjustment of the needle valve determines the time of descent of the weight.

Figure 12:
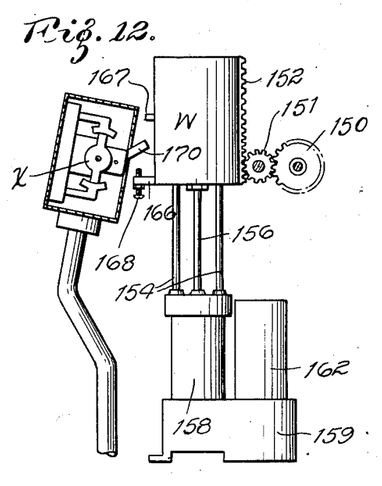
Fig. 12 is a vertical section, partly diagrammatic, on the line 12—12 of Fig. 8, showing the switch closed.
Figure 13:
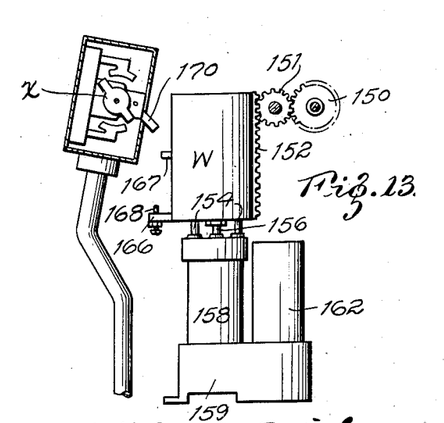
Fig. 13 is a similar view, showing the switch open.

The weight carries a pair of outstanding fingers 166, 167, (Figs. 12 to 16). The former carries an adjustable set screw 168 (Figs. 12 and 13). Upon upward travel of the weight the set screw strikes a lever of a snap switch S and moves the lever far enough to throw the switch from open-circuit position (Fig. 13) to closed-circuit position (Fig. 12) thereby energizing the motor M (Figs. 2 and 14) and thus starting the pump. The pump forces liquid through the inlet valve and into the container. Upon descent of the weight the upper finger 167 engages the lever 170 and opens the switch.

*Fifth level* (Figs. 1 to 4, 18 and 19).—The container C (Figs. 1 to 4, 18 and 19) is a vertical cylinder having a gauge glass 172 (Fig. 19) attached thereto to show the level of liquid in the container. The container C is mounted on the scale mechanism above described in connection with the scale K, and is adapted for a moderate amount of vertical movement. The overflow pipe 33 terminates at the bottom of the fifth level (Fig. 18) at a liquid-tight and vapor-tight seal 173, into which extends a pipe 174, to the upper end of which is threaded an annular member 176. The pipe 174 is coaxial with the container and with the adjacent portion of pipe 33 and with the seal. The pipe 174 is secured to the bottom or floor of the container, and moves up and down with the container. The seal is of proper proportions to permit such movement and yet to maintain at all positions of the pipe a liquid-tight and vapor-tight connection between the pipe 174 and the pipe 33 beneath it. By adjustment of the annular member 176 with respect to the pipe 174 the level, within the container, at which overflow occurs, may be adjusted.

A wire network or cage 178 surrounds the fifth level and serves to protect the contents thereof.

*Sixth level* (Figs. 1 to 4).—Surmounting the dome in a translucent globe 180 (Figs. 1 to 4) containing an electric light for illuminating and/or advertising purposes.

Operation.

*Neutral position* (Figs. 1, 2, 5, 6, 8 and 14).—The inlet handle IH is at the right. The discharge handle DH is up. The weight W is down. The gasoline path is open from the container through the pipe 144, inlet valve IV, pipe 135, discharge valve DV, siphon breaker 141, and return pipe 33 to the reservoir R. The container is empty. Assume that the indicating needles 85, 86 and totalizing needle 88 are all at zero, that is, vertically upward.

*Inlet event* (Fig. 15).—When the container C has gasoline pumped into it, the operator rotates the inlet handle IH clockwise for three quarters of a revolution, from the Fig. 14 position to the verically upward position shown in Fig. 15. This raises the weight W, closing the switch X and starting the motor M, which operates the pump P to pump liquid from the reservoir R up through the inlet pipe I. This movement of the inlet valve also rotates the inlet valve IV to the position shown in Fig. 15, where a path is opened from the inlet pipe I to the pipe 144. Gasoline is thus pumped from the reservoir into the container. After the container has received the proper amount of gasoline, any excess flows back to the reservoir through the pipe 174 and return pipe 33.

As the container fills, its weight increases and it moves vertically downward due to the scale mechanism K. The weights 75 move outwardly to an extent corresponding to the downward movement of the container. The clutch 96 is open at this time, so that the movement of the scale mechanism does not cause movement of the totalizing devices.

When the operator releases the inlet handle IH, the weight W descends, opening the switch X, which de-energizes the motor and thus stops the pump. By virtue of the dash-pot 159, the weight descends slowly. Early in its downward movement the weight opens the motor switch, due to the positioning of the upper finger 167 and the cooperating lever 170 of the switch. This at once de-energizes the motor, which quickly comes to rest because of its direct connection to the pump, which is under load. The parts are so proportioned that the pump comes to rest before the port 142 of the inlet valve closes the passage from the intake pipe I to the pipe 144.

An appreciable time elapses after the closing of the passage from inlet pipe to pipe 144, before the passage from pipe 144 to pipe 135 is opened. The exact amount of such time can be predetermined by adjusting the dash-pot in the manner above described. This time interval permits the operator to shift the discharge handle to discharge position. It also permits the scale mechanism to come to rest, and the excess gasoline to pass out through the overflow, and makes sure that the apparatus is in readiness for accurate measurement during discharge.

*Discharge event* (Fig. 16.)—To discharge gasoline from the container to the hose, the operator first places the hose nozzle end in the receptacle (not shown) that is to receive the gasoline. This is preferably done prior to the inlet event. Then, preferably after the inlet handle has been released, and in any event before the passage from the pipe 144 to the pipe 135 has started to open, the operator moves the discharge handle DH clockwise one-fourth of a revolution from its vertically upward position shown in Fig. 15 to its rightward position shown in Fig. 16. This closes the passage from the pipe 135 to the return pipe 33, and opens a passage from the pipe 135 to the pipe 139, thence through the siphon breaker 141 to the hose D.

This movement of the discharge handle DH to discharge position also closes the clutch 96, thereby connecting the indicating and totalizing mechanism to the scale mechanism so that ascent of the container operates the totalizing mechanism.

A weight 133 movable with the discharge handle acts as a counterweight to restore the discharge handle to such a position when the operator releases his grip upon it.

The operator can stop the discharge event at any instant by releasing pressure on the discharge handle DH. He does so when the desired amount has been discharged, as evidenced by the customer's needs or by the position of the indicating needle.

When pressure on the discharge handle is released, the weight 133 causes the handle to return to neutral, and no further discharge takes place. The operator and customer are thus able to read the amount of gasoline that has been discharged from the container. When the discharge handle approaches its neutral position, the container begins to empty back to the reservoir. The clutch mechanism is so timed that the clutch opens before the passage from pipe 135 to return 33 is opened at the discharge valve. It is thus not possible for the totalizing mechanism to be affected by any gasoline that is being emptied back to the reservoir.

When the operator releases the discharge handle and the discharge handle reaches neutral position, the parts are all in their initial position save that the totalizing mechanism shows the amount of gasoline that has been discharged.

In view of the above, it is believed that the various features of this invention will be clear without further elaboration, and it will be seen that with the apparatus herein described, the several objects of the inventions are achieved and other advantageous results attained.

As many changes could be made in carrying out the above construction without departing from the scope of the invention, it is intended that all matter contained in the above description or shown in the accompanying drawings shall be interpreted as illustrative and not in a limiting sense.

We claim:

1. A filling station combining a container, an automatic scale from which said container is suspended comprising a counterweighted lever system for the container, and weights automatically operable thereby to balance the contents of the container, means for filling the container, means for discharging liquid therefrom, and means for indicating the position of the scale.

2. A filling station combining a container, an automatic scale from which said container is suspended, means for filling the container, means for discharging liquid therefrom, means for indicating the position of the scale, means for totalizing the weight of liquid discharged comprising a device closable to operate, a connecting mechanism adapted to open and close said device, operable from and connected with said discharging means.

3. A filling station combining a container, an automatic scale on which said container is mounted; a reservoir; means for discharging liquid from said container; a totalizer adapted to register the liquid discharged; a drive for said totalizer from the scale; a clutch in said drive; and means for opening the clutch during emptying from the container to the reservoir; said clutch being closed by movement of the discharge means to discharge position.

4. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve adapted for connection to a dispensing device; a fourth conduit from the discharge valve to the reservoir; and an overflow from the container to said fourth conduit.

5. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; and a totalizer adapted to register the liquid discharged.

6. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; and a motor switch adapted to be closed upon the movement of the inlet valve to inlet position and to be opened upon return movement of said valve.

7. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; a motor switch adapted to be closed upon the movement of the inlet valve to inlet position and to be opened upon return movement of said valve; and a totalizer adapted to register the liquid discharged.

8. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a totalizer adapted to register the liquid discharged; and a drive therefor from the scale;

9. A filling station combining a container, an automatic scale on which said container is mounted; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; a motor switch adapted to be closed upon the movement of the inlet valve to inlet position and to be opened upon return movement of said valve; a totalizer adapted to register the liquid discharged; a drive therefor from the scale; and a clutch in said drive; and means for opening the clutch during emptying from the container to the reservoir.

10. A filling station combining a container; means for filling the container, said means comprising a conduit extending above the container and down into the container and discharging liquid laterally therein; means, comprising a conduit concentric with respect to the container and limiting the amount in the container to a predetermined quantity; an automatic scale on which said container is mounted; said last-named conduit having a portion movable with the container, a portion fixed in position, and a liquid-tight seal between the two portions.

11. A filling station combining a container; means for filling the container, said means comprising a conduit extending above the container and down into the container and discharging liquid laterally therein; means limiting the amount in the container to a predetermined quantity; an automatic scale on which said container is mounted; means controlled thereby for indicating the weight of liquid in the container at or below said maximum quantity; and manually controlled means for discharging from said container desired portions of the liquid therein, said last-named means comprising a conduit communicating with the first conduit.

12. A filling station combining a container; means for filling the container; means, comprising a conduit concentric with respect to the container and limiting the amount in the container to a predetermined quantity; an automatic scale on which said container is mounted; said last-named conduit having a portion movable with the container, a portion fixed in position, and a liquid-tight seal between the two portions; means controlled thereby for indicating the weight of liquid in the container at or below said maximum quantity; and manually controlled means for discharging from said container desired portions of the liquid therein.

13. A filling station combining a container; means for filling the container; said means comprising a conduit extending above the container and down into the container and discharging liquid laterally therein; means, comprising a conduit concentric with respect to the container and limiting the amount in the container to a predetermined quantity; an automatic scale on which said container is mounted; said last-named conduit having a portion movable with the container, a portion fixed in position, and a liquid-tight seal between the two portions; means controlled thereby for indicating the weight of liquid in the container at or below said maximum quantity; and manually controlled means for discharging from said container desired portions of the liquid therein, said last-named means comprising a conduit communicating with the first conduit.

14. A filling station combining a container; an automatic scale on which said container is mounted; means for admitting liquid to the container, said means comprising a conduit extending above the container and down into the container and discharging liquid laterally therein; means limiting automatically the maximum level of liquid in the container; manually controlled means for discharging by gravity from said container desired amounts of the liquid therein; and means for indicating the weight of the amounts discharged, such indication being given automatically.

15. A filling station combining a container; an automatic scale on which said container is mounted; means for admitting liquid to the container, said means comprising a conduit extending above the container and down into the container and discharging liquid laterally therein; means limiting automatically the maximum level of liquid in the container; manually controlled means for discharging by gravity from said container desired amounts of the liquid therein, said last-named means comprising a conduit communicating with the first conduit; and means for indicating the weight of the amounts discharged, such indication being given automatically.

16. A filling station combining a container; an automatic scale on which said container is mounted; means for admitting liquid to the container; means limiting automatically the maximum level of liquid in the container, comprising a conduit concentric with respect to the container; manually controlled means for discharging by gravity from said container desired amounts of the liquid therein; said conduit having a portion movable with the container, a portion fixed in position, and a liquid-tight seal between the two portions; and means for indicating the weight of the amounts discharged, such indication being given automatically.

17. A filling station combining a container; an automatic scale on which said container is mounted; means for admitting liquid to the container, said means comprising a conduit extending above the container and down into the container and discharging liquid laterally therein; means limiting automatically the maximum level of liquid in the container, comprising a conduit concentric with respect to the container; manually controlled means for discharging by gravity from said container desired amounts of the liquid therein; said last-named conduit having a portion movable with the container, a portion fixed in position, and a liquid-tight seal between the two portions; and means for indicating the weight of the amounts discharged, such indication being given automatically.

18. A filling station combining a container; an automatic scale on which said container is mounted; means for admitting liquid to the container, said means comprising a conduit extending above the container and down into the container and discharging liquid laterally therein; means limiting automatically the maximum level of liquid in the container, comprising a conduit concentric with respect to the container; manually controlled means for discharging by gravity from said container desired amounts of the liquid therein, said last-named means comprising a conduit communicating with the first conduit; said last-named conduit having a portion movable with the container, a portion fixed in position, and a liquid-tight seal between the two portions; and means for indicating the weight of the amounts discharged, such indication being given automatically.

19. A filling station combining a container adapted to hold a predetermined quantity of liquid and having a conduit for inlet and discharge and a conduit for overflow; an automatic scale on which said container is mounted; means for discharging liquid from said container; and a seal in said overflow conduit, said seal comprising two parts located respectively on the container and on the adjacent conduit portion movable relatively to the container.

20. A filling station combining a container adapted to hold a predetermined quantity of liquid, an automatic scale on which said container is mounted, a valve operable from the exterior of the apparatus for discharging liquid from said container, and means for draining the container automatically when the operator releases said valve.

21. In apparatus of the class described, a container, an automatic scale supporting the container, means, comprising a pump, for filling the container, means limiting the amount of liquid in the container, means comprising a manually operated valve for discharging by gravity part or all of the liquid from the container, a totalizer visible from the exterior of the apparatus, and means operated automatically by the scale for causing said totalizer to indicate automatically the weight of liquid discharged from the container.

22. A filling station combining an underground reservoir, a discharge device for dispensing fluid, a pump, a motor therefor, a container adapted to hold a predetermined quantity of liquid pumped into it by said pump, an automatic scale on which said container is mounted, means for discharging liquid from said container, means for relieving the scale arm of any disturbance due to filling and discharge, an overflow tube limiting the height of liquid in said container, and a totalizer operated by the scale for registering the liquid discharged.

23. A filling station combining a container; means for filling the container; means limiting the amount in the container to a predetermined quantity; an automatic scale on which said container is mounted; means controlled thereby for indicating the weight of liquid in the container at or below said maximum quantity; means for totalizing the weight of liquid discharged; means for operating the totalizer by the movement of said scale; and means for rendering said operating means inoperative during emptying.

24. A filling station combining a container; means for filling the container; means limiting the amount in the container to a predetermined quantity; an automatic scale on which said container is mounted; means controlled thereby for indicating the weight of liquid in the container at or below said maximum quantity; a totalizer; and means for operating said totalizer by the ascending movement of the container.

25. A filling station combining a container; means for filling the container; means limiting the amount in the container to a predetermined quantity; an automatic scale on which said container is mounted; means controlled thereby for indicating the weight of liquid in the container at or below said maximum quantity; a totalizer driven by the ascending movement of the container to register the weight of liquid discharged; a clutch in the totalizer drive; and means for opening the clutch automatically during emptying.

26. A filling station combining a container; means for filling the container, said means comprising a conduit extending above the container and down into the container and discharging liquid laterally therein; means limiting the amount in the container to a predetermined quantity; an automatic scale on which said container is mounted; means controlled thereby for indicating the weight of liquid in the container at or below said maximum quantity; and manually controlled means for discharging from said container desired portions of the liquid therein; and means for totalizing the weight of liquid discharged.

27. A filling station combining a container; an automatic scale on which said container is mounted; means for admitting liquid to the container, said means comprising a conduit extending above the container and down into the container and discharging liquid laterally therein; means limiting automatically the maximum level of liquid in the container; manually controlled means for discharging by gravity from said container desired amounts of the liquid therein; and means for indicating the weight of the amounts discharged, such indication being given automatically; a totalizer driven by the ascending movement of the container to register the weight of liquid discharged; a clutch in the totalizer drive; and means for opening the clutch automatically during emptying.

28. A filling station combining a container; an automatic scale on which said container is mounted; means for admitting liquid to the container, said means comprising a conduit extending above the container and down into the container and discharging liquid laterally therein; means limiting automatically the maximum level of liquid in the container, comprising a conduit concentric with respect to the container; manually controlled means for discharging by gravity from said container desired amounts of the liquid therein, said last-named means comprising a conduit communicating with the first conduit; said last-named conduit having a portion movable with the container, a portion fixed in position, and a liquid-tight seal between the two portions; and means for indicating the weight of the amounts discharged, such indication being given automatically; means for totalizing the weight of liquid discharged; a clutch in the totalizer drive; and means for opening the clutch automatically during emptying.

29. A filling station combining a container; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; and a motor switch adapted to be closed upon the movement of the inlet valve to inlet position and to be opened upon return movement of said valve.

30. A filling station combining a container; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; a motor switch adapted to be closed upon the movement of the inlet valve to inlet position and to be opened upon return movement of said valve; and a totalizer adapted to register the liquid discharged.

31. A filling station combining a container; a reservoir; a pump connected thereto; a conduit from the pump to the container; an inlet valve in said conduit; a discharge valve; a second conduit from one valve to the other; a third conduit from the discharge valve to a dispensing device; a fourth conduit from the discharge valve to the reservoir; an overflow from the container to said fourth conduit; a motor adapted to drive the pump; a motor switch adapted to be closed upon the movement of the inlet valve to inlet position and to be opened upon return movement of said valve; adjustable means for delaying said return movement; a totalizer adapted to register the liquid discharged; a drive therefor; and a clutch in said drive; and means for opening the clutch during emptying from the container to the reservoir.

In testimony whereof, we have signed our names to this specification this 18th day of October, 1922, this 18th day of October, 1922, and this 28th day of June, 1922, respectively.

WILLARD D. SMITH.
HARRY D. SMITH.
SHERWOOD HINDS.